United States Patent [19]

Lichtblau

[11] 3,938,044

[45] Feb. 10, 1976

[54] ANTENNA APPARATUS FOR AN ELECTRONIC SECURITY SYSTEM

[76] Inventor: George Jay Lichtblau, 425 E. 63rd St., New York, N.Y. 10021

[22] Filed: Nov. 14, 1973

[21] Appl. No.: 415,657

[52] U.S. Cl. ................ 325/22; 340/258 C; 343/180

[51] Int. Cl.² ........................................... H04B 1/48

[58] Field of Search ..................... 325/8, 21, 22, 29; 340/258 R, 258 B, 258 C, 7 A, 180; 343/7 A, 180, 787, 788

[56] References Cited

UNITED STATES PATENTS

| | | | |
|---|---|---|---|
| 3,227,954 | 1/1966 | Fichter, Jr.; | 325/22 |
| 3,624,631 | 11/1971 | Chomet et al. | 340/258 C X |
| 3,820,103 | 6/1974 | Fearon | 340/258 C |

*Primary Examiner*—Benedict V. Safourek
*Attorney, Agent, or Firm*—Weingarten, Maxham & Schurgin

[57] ABSTRACT

For use in an electronic security system wherein a resonant tag circuit is sensed to denote an alarm condition, an antenna system which senses the presence of a resonant tag circuit and, upon such sensing, can automatically activate a deactivation field for destruction of the resonant properties of the tag circuit at its sensing frequency and provide an output indication that tag deactivation has been achieved. The antenna system includes a high Q resonant loop antenna for providing a deactivation field, and a coplanar sensing loop antenna isolated from the sensing circuitry during operation of the deactivation antenna.

28 Claims, 4 Drawing Figures

ANTENNA APPARATUS FOR AN ELECTRONIC SECURITY SYSTEM

FIELD OF THE INVENTION

This invention relates to electronic security systems for sensing the presence of a resonant circuit in an area under protection, and more particularly to antenna systems therefor.

BACKGROUND OF THE INVENTION

Electronic security systems are known in which a resonant circuit is electromagnetically interrogated, the presence of such resonant circuit within a predetermined area under protection being indicative of an alarm condition. Such systems are employed, for example, for pilferage control in retail stores, libraries and the like wherein the resonant circuit is affixed to items being protected, such that unauthorized removal of an item from the protected area will occasion an alarm. A preferred system is the subject of copending application Ser. No. 214,361, filed Dec. 30, 1971, of the same inventor as herein, in which a resonant tag circuit is operative at two frequencies, a first frequency for sensing tag presence and a second frequency for deactivation of the circuit by altering or destroying its resonant properties at the first or detection frequency. Deactivation of the tag circuit is accomplished by applying an electromagnetic field to the circuit of a strength sufficient to fuse a conductive link therein to alter resonant circuit characteristics. The electromagnetic field can be provided by manual actuation when a tag is presented to an attendant for such purpose. It is often desirable, however, to provide an automated means for applying a deactivation field when a tag is presented for such deactivation and also to sense that deactivation has indeed been accomplished.

SUMMARY OF THE INVENTION

In accordance with the invention, an antenna system is provided for use in an electronic security system and by which the presence of a resonant tag circuit is sensed and an electromagnetic field is then produced for deactivation of the tag circuit, after which an output indication is provided to denote that deactivation has been achieved. The novel system includes a high Q resonant loop antenna driven by a stable transmitter operative at the deactivation frequency of the tag circuit. A coplanar loop antenna is provided for sensing tag presence and is isolated during operation of the deactivation antenna in a manner which prevents damage to the sensing circuitry and which prevents material loading of the deactivation antenna.

DESCRIPTION OF THE DRAWING

The invention will be more fully understood from the following detailed description, taken in conjunction with the accompanying drawing, in which.

DETAILED DESCRIPTION OF THE INVENTION

According to the invention, an antenna system is provided to sense the presence of a resonant tag circuit at a predetermined area and to destroy or alter its resonant properties by applying electromagnetic energy thereto. In a typical security system implementation in a department store, library or other location, an antenna for resonant tag detection is provided at a controlled area such as near the egress of the facility to sense the presence of a resonant tag within this area and to provide an alarm indication of tag presence. At a different area of the facility, such as a checkout counter, the tag detection and destruction system incorporating the present invention is employed to alter the resonant properties of the tag in order that it should not cause an alarm when subsequently brought into the controlled area.

Figure 1:
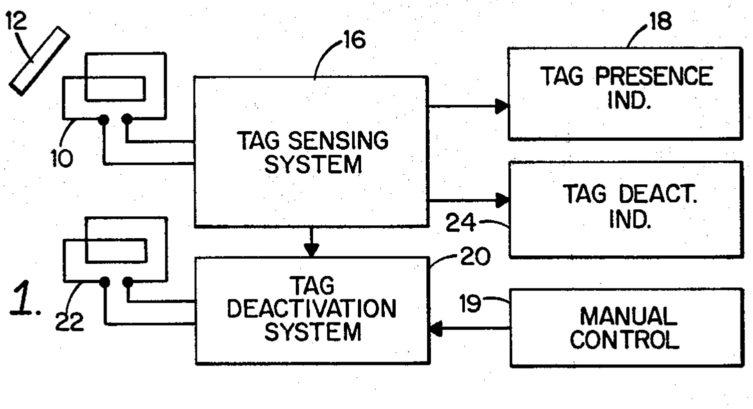
FIG. 1 is a block diagram representation of part an electronic security system in which the invention is advantageously employed.

Referring to FIG. 1, an antenna 10 driven by a transmitter in tag sensing system 16 provides an electromagnetic field within a prescribed area in which a resonant tag circuit 12 is presented for detection and deactivation. The presence of a tag circuit within the interrogating field is sensed by antenna 10 and associated system 16 and an output signal provided to an indicator 18 denoting tag presence. Upon detection of tag 12, system 16 can also provide a signal to a tag deactivation system 20 to cause energization of an antenna 22 operative at the deactivation frequency of tag 12 to cause deactivation of the resonant properties of the tag at its detection frequency. Alternatively, system 20 can be manually energized by manual control 19 to cause tag deactivation after an attendant notes the presence of a tag by means of indicator 18. After operation of system 20, tag deactivation is verified by the absence of the tag detection frequency sensed by antenna 10 and in which event system 16 provides an output indication of such deactivation by means of indicator 24. In the system of FIG. 1 herein the antenna 10 is used for both aspects of tag interrogation; transmission at the detection frequency and sensing tag presence at the detection frequency. Antenna 10 and the associated transmitter within system 16 provide an electromagnetic field at a frequency which is swept within a range including the detection frequency of the resonant tag circuit. The resonant response of the tag to the interrogating field is sensed by the detection circuitry of system 16. In alternative implementation, separate antannas can be employed for transmission and tag sensing, although the single antenna version is usually preferable.

Figure 2:
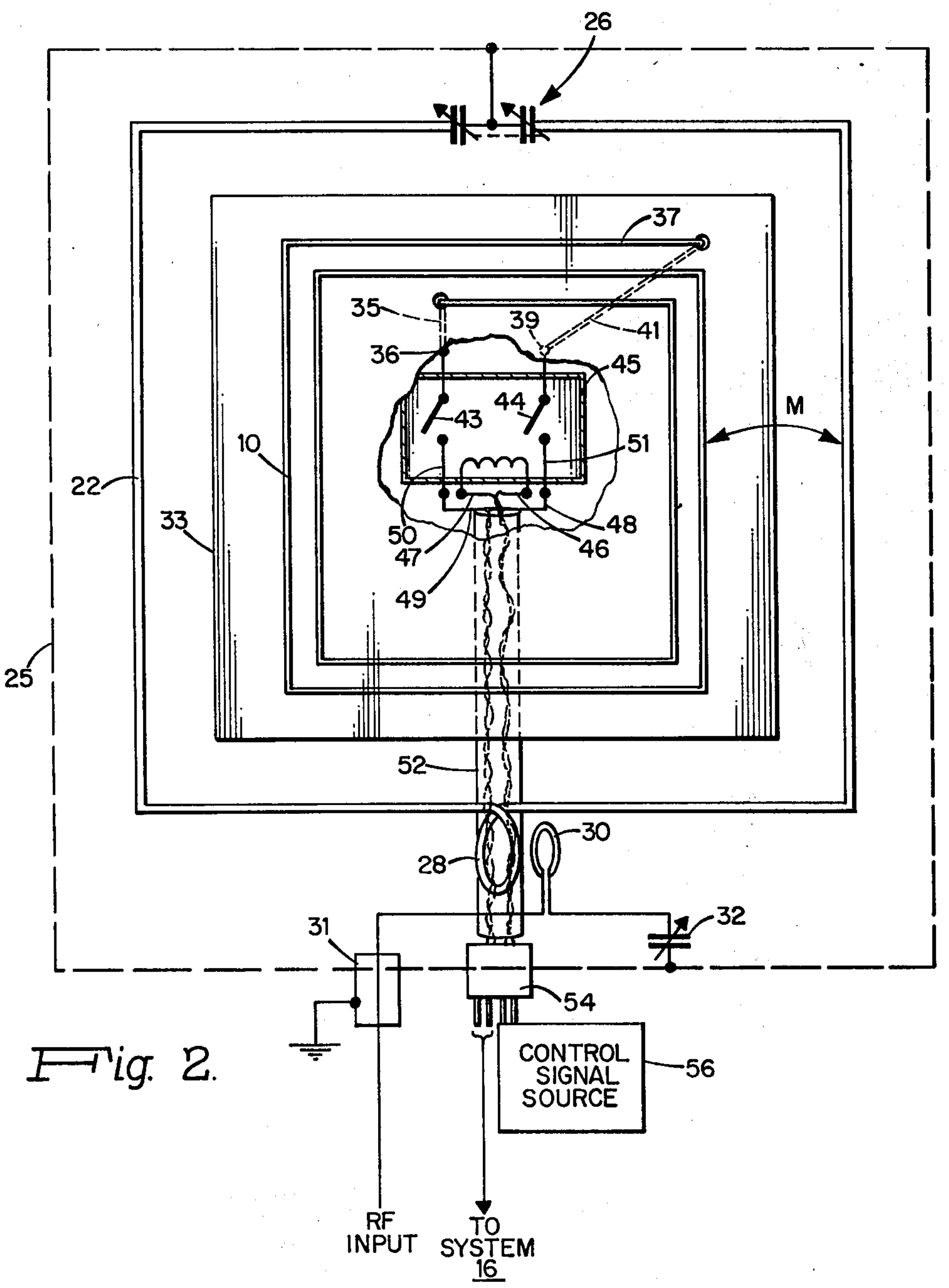
FIG. 2 is a combined plan and schematic representation of the antenna system of the invention.
Figure 3:
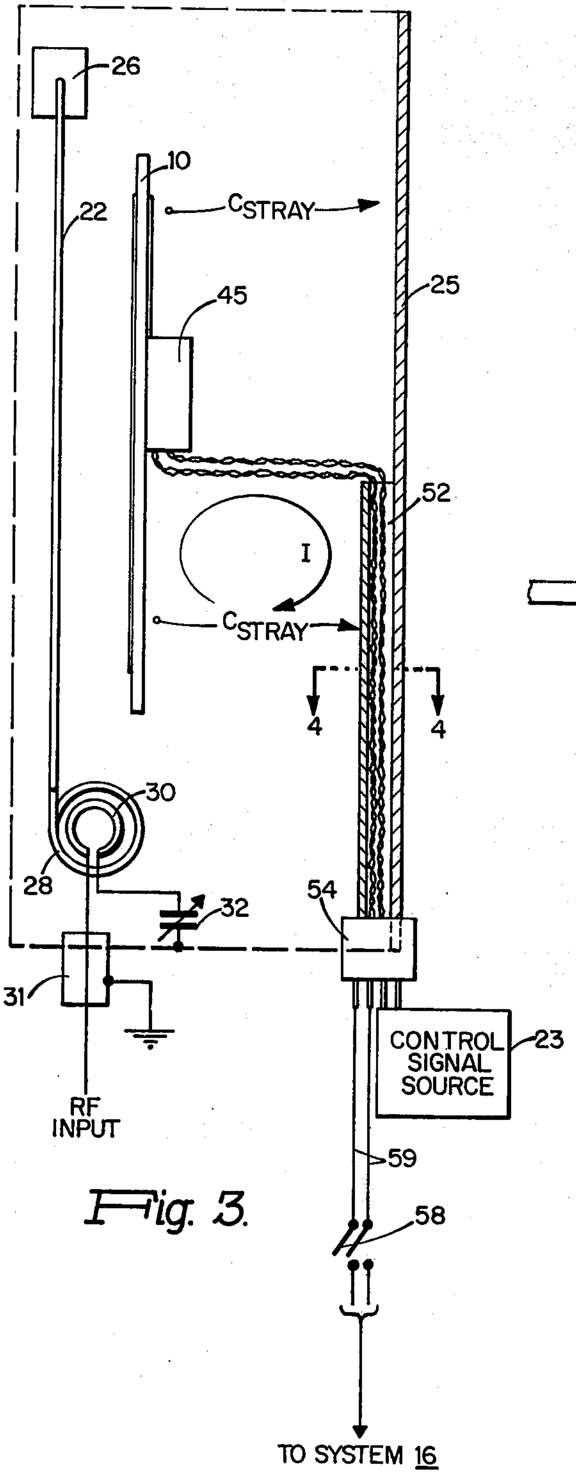
FIG. 3 is an elevation view of the antenna system of FIG. 2.

Antennas 10 and 22 are constructed and operative according to the invention as illustrated in FIGS. 2 and 3. The deactivation antenna 22 is a generally square single turn planar loop having a very high Q, typically over 300, and driven by an inductive coupling loop 28 integral with the antenna and disposed in a plane perpendicular to the plane of the antenna. The antenna loop is in series with a variable capacitor 26 which, in the illustrated embodiment, is a ganged two-section capacitor having a grounded center terminal. Antenna 22 is typically formed of copper tubing of sufficient size to conduct the relatively high current present during antenna operation and to dissipate the heat generated by such high current. The antenna is mounted within a conductive shielded housing 25 and is supported in operative disposition by stand-off insulators or other support means.

Antenna 22 is coupled to the RF output of the transmitter in tag deactivation system 20 (FIG. 1) by means of an inductive loop 30 disposed in parallel coupling relationship with loop 28 and connected at one end to the center terminal of a coaxial connector 31 and at the other end by a variable capacitor 32 to ground. The shielded terminal of connector 31 is also connected to ground via housing 25. The transmitter is typically operative at a frequency of 27.12 MHz with a power output of 150 watts. In order to obtain maximum power transfer from the transmitter to antenna 22, it is necessary to tune the antenna precisely to the transmitter frequency, and variable capacitor 26 is operative for this purpose. Capacitor 32 is similarly operative for tuning loop 30 to provide maximum resonance at the resonant frequency of loop 28 at the particular spatial separation of the loops. The relative position of loops 28 and 30 is selected for efficient power transfer.

Sensing antenna 10 is a multi-turn loop antenna having a number of turns sufficient to provide requisite sensitivity for detecting tag presence. The antenna is formed as a printed or etched conductive path on one surface of a circuit board 33. The inner end 35 of antenna 10 is conductively connected to a terminal pad 36 on the opposite side of board 33, while the outer end 37 of the antenna is also conductively connected to the opposite board surface and connected to a terminal pad 39 by means of a conductive path 41. The terminal pads 36 and 39 are connected to contacts 43 and 44 of a high voltage double pole single throw relay 45, typically a reed relay, which is secured to the same surface of board 33 as the terminal pads.

The antenna 10 is symmetrically disposed in parallel spaced coaxial relationship to antenna 22 to provide uniform coupling between the antennas. The control leads 46 and 47 for the coil of relay 45, and the antenna leads 48 and 49 connected respectively to relay terminals 50 and 51, extend in separate twisted pairs from the center of antenna 10 along an axis orthogonal to the plane of the antenna and centered with respect thereto to the bottom of enclosure 25, at which position the control and antenna wires are conveyed within an electrical shield 52 to a connector 54 disposed at a side of enclosure 25. Alternatively, the interconnecting wires extending orthogonally from antenna 10 can pass directly through the bottom wall of enclosure 25 through a suitable connector for coupling to the associated circuitry. A control signal source 56 provides an energizing signal to the relay coil via connector 54 and wires 46 and 47. The wires 48 and 49 are coupled by connector 54 to system 16 (FIG. 1).

The detection and deactivation antennas are disposed in coplanar adjacent relationship as described in order to provide substantially coextensive area of coverage for detection and deactivation. As a result, there is normally a large mutual coupling between the antennas. During operation of deactivation antenna 22, a high voltage, typically in excess of 10,000 volts, which could destroy electronic circuitry in tag sensing system 16, can be induced in antenna 10. According to the invention, antenna 10 is effectively isolated from tag deactivation system 16 to prevent destruction of the sensing circuitry of system 16 during energization of antenna 22, and is open-circuited to prevent loading of the high Q deactivation antenna by sensing antenna 10, which could result in a loss of transmitted power. In particular, when antenna 22 is in operation, relay 45 is opened to disconnect antenna 10 from antenna leads 48 and 49 and cause antenna 10 to appear as an open-circuited loop. The reed relay has very low contact capacity, typically less than one picofarad per contact, to prevent current leakage across the open relay contacts at the relatively high frequency of operation. Additionally or as an alternative, a relay 58 or other switching device can be provided as shown in FIG. 3 at the opposite end of a cable 59 which connects the antenna system to the sensing circuitry in system 16 to further insure isolation between antenna 22 and the sensing circuitry during operation of antenna 22.

Stray coupling between antenna 22 and the wires 46, 47, 48 and 49 extending from relay 45 and antenna 10 to shield 52 is also minimized by the centered and orthogonal position of the wires with respect to the plane of antenna 22 and the use of twisted pairs. The symmetrical disposition of antenna 10 within enclosure 25 and with respect to antenna 22 provides a balanced capacitance to ground and uniform coupling between the antennas.

Figure 4:
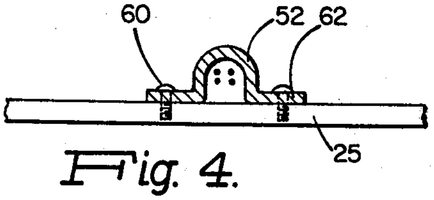
FIG. 4 is a sectional view of a portion of the antenna system taken along lines 4—4 of FIG. 3.

The electrical shield 52 is illustrated in a preferred implementation in FIG. 4 and includes an elongated conductive enclosure, typically formed of aluminum, disposed along the path of the interconnecting wires and secured to conductive housing 25 by fasteners 60 such as machine screws or spotwelds attached to flanges 62. The shield engages the confronting wall of housing 25 to eliminate gaps through which magnetic flux might otherwise pass.

The operation of the invention will now be described in detail. The relay contacts of relay 45 are normally closed and antenna 10 is in condition to sense the presence of a tag circuit within a given area at the detection frequency of the tag. Received signals from antenna 10 are supplied via leads 48 and 49 to suitable processing circuitry in tag sensing system 16. In response to detection of a tag at the detection frequency, system 16 may automatically provide a signal to tag deactivation system 20 to cause provision of an energizing signal to inductive loop 30 for coupling to loop 28 to thereby energize transmitting antenna 22 for energy transmission at the tag destruction frequency. Simultaneously with energization of antenna 22, a control signal is supplied from a suitable source 56, which can be part of system 16, to relay 45 to cause opening of the relay switch contacts. The antenna terminals are thus effectively isolated from antenna leads 48 and 49 and from each other in order to render antenna 10 as an open loop. Simultaneous with the activation of antenna 22, a further relay 58 may be energized to decouple antenna leads 48 and 49 and also if desired, control leads 46 and 47 from system 16.

Transmitting antenna 22 is caused to transmit at the destruction frequency at a predetermined energy level for a predetermined period of time. Antenna 10 is subsequently activated for detection of tag presence. In the absence of detection of the resonant tag at its detection frequency, a tag deactivation indicator is energized by signals from tag sensing system 16. Should, on the contrary, tag detection be indicated, antenna 22 may again be energized and detection is again attempted until deactivation has indeed occurred.

It will be apparent that the antenna system of the invention is not to be limited to the particular embodiments and configurations herein described, as many variations in the implementation of the invention will occur to those skilled in the art.

What is claimed is:

1. An antenna system comprising:

a receiving loop antenna;

utilization means coupled to said receiving antenna and operative to provide an output indication of the presence of a resonant tag circuit in coupling relationship with said receiving antenna;

a transmitting loop antenna;

means for disposing said receiving and transmitting antennas in coplanar adjacent spaced balanced coupling relationship;

means for energizing said transmitting antenna to provide an electromagnetic field at a predetermined fixed frequency to alter the resonant properties of a tag circuit present in coupling relationship with said transmitting antenna and including:

coupling means operative to supply energizing signals to said transmitting antenna;

switching means operative to isolate said transmitting antenna from said utilization means upon energization of said transmitting antenna thereby to prevent damage to said utilization means during operation of said transmitting antenna, said switching means including:

a switch device disposed at a symmetrical center position with respect to said receiving antenna and coupled to respective ends thereof; and a plurality of lead wires interconnecting said switch device and said utilization means and disposed in a centered and orthogonal position with respect to the plane of said receiving antenna to minimize stray coupling between said lead wires and said receiving antenna.

2. An antenna system according to claim 1 wherein said coupling means includes:

a first inductive loop on said transmitting antenna; and a second inductive loop on said transmitting means;

said first and second loops being disposed in a plane perpendicular to the plane of said transmitting and receiving antennas and in adjacent spaced coplanar relationship to each other.

3. An antenna system according to claim 1 wherein said switching means includes means operative to render said receiving antenna as an open loop upon energization of said transmitting antenna.

4. Deactivation antenna apparatus for an electronic security system comprising:

transmitter means for providing an electromagnetic field in a predetermined area at a first frequency;

a multi-resonant tag circuit having a first resonant frequency at said first frequency and a second resonant frequency;

a receiving antenna;

utilization means coupled to said receiving antenna and operative to provide an output indication of the presence of said tag circuit;

a transmitting loop antenna for providing an electromagnetic field in a predetermined area at said second frequency;

said receiving and transmitting antennas being disposed in coplanar adjacent spaced balanced coupling relationship;

means for energizing said transmitting antenna to alter the resonant properties of said tag circuit at said first frequency, including:

transmitting means;

coupling means operative to supply energizing signals from said transmitting means to said transmitting antenna;

switching means operative to isolate said receiving antenna from said utilization means upon energization of said transmitting antenna, thereby to prevent damage to said utilization means during operation of said transmitting antenna.

5. Deactivation antenna apparatus according to claim 4 wherein said coupling means includes:

a first inductive loop on said transmitting antenna and disposed in a plane perpendicular to the plane of said transmitting antenna;

a second inductive loop on said transmitting means and disposed in adjacent spaced coplanar relationship to said first inductive loop; and a variable capacitor in circuit with said second inductive loop to provide maximum coupling to said first inductive loop;

and wherein said transmitting loop antenna includes a variable capacitor in series therewith for tuning said transmitting loop antenna to resonance at said first frequency.

6. Deactivation antenna apparatus according to claim 4 including received signal transmission means coupled to said receiving antenna and comprising a plurality of electrical conductors disposed between and connected to said switching means and extending in a direction perpendicular to the plane of said receiving antenna to a point at which said conductors are surrounded by a metal shield.

7. Deactivation antenna apparatus according to claim 6 wherein said switching means includes:

relay means having first and second contacts in electrical connection with respective ends of said receiving antenna;

third and fourth contacts respectively cooperative with said first and second contacts and coupled to said received signal transmission means; and a relay coil having leads coupled to a control signal source;

said relay coil upon energization by a signal from said control signal source causing closure of said first and third contacts and said second and fourth contacts respectively to couple said receiving antenna to said utilization means and operative upon de-energization to isolate said receiving antenna from said utilization means.

8. Deactivation antenna apparatus according to claim 6 wherein said switching means further includes a plurality of switches connected to said plurality of electrical conductors at an end opposite to said switching means and operative to further isolate said receiving antenna from said utilization means upon energization of said transmitting antenna.

9. Deactivation antenna apparatus according to claim 4 wherein said receiving loop antenna comprises a multi-turn planar loop disposed on a surface of an insulative circuit board;

first and second conductive areas disposed on the surface of said circuit board opposite to said multi-turn loop conductively connected through said circuit board to respective ends of said multi-turn loop;

said switching means being connected to said conductive areas.

10. An antenna system comprising:

a receiving loop antenna operative to provide an output indication of the presence of a resonant tag circuit;

a transmitting loop antenna;

said receiving and transmitting antennas being disposed in coplanar adjacent spaced balanced coupling relationship;

means for energizing said transmitting antenna to alter the resonant properties of said tag circuit in response to a received signal from said receiving antenna including:

signal transmission means operative to supply said received signal to said energizing means;

transmitting means operative in response to said received signal;

coupling means operative to supply energizing signals from said transmitting means to said transmitting antenna in response to said received signal; and switching means operative in response to said received signal to isolate said receiving antenna from said energizing means upon energization of said transmitting antenna, thereby to prevent damage to said energizing means during operation of said transmitting antenna.

11. An antenna system according to claim 10 wherein said coupling means includes:

a first inductive loop on said transmitting antenna; and a second inductive loop on said transmitting means;

said first and second loops being disposed in a plane perpendicular to the plane of said transmitting and receiving antennas and in adjacent spaced coplanar relationship to each other.

12. An antenna system according to claim 10 wherein said signal transmission means includes a plurality of electrical conductors disposed between and connected to said switching means and extending in a direction perpendicular to the plane of said receiving antenna to a point at which said conductors are surrounded by a metal shield.

13. An antenna system according to claim 12 and including a conductive housing surrounding said antennas and wherein said metal shield includes an elongated conductive enclosure surrounding said conductors and fastened to said antenna housing in a manner to eliminate gaps through which magnetic flux might pass.

14. An antenna system according to claim 10 wherein said switching means includes means operative in response to said received signal to render said receiving antenna as an open loop upon energization of said transmitting antenna.

15. Deactivation antenna apparatus for an electronic security system comprising:

transmitter means for providing an electromagnetic field in a predetermined area at a first frequency;

a multi-resonant tag circuit having a first resonant frequency at said first frequency and a second resonant frequency;

a receiving antenna operative to provide an output indication of the presence of said tag circuit;

a transmitting loop antenna for providing an electromagnetic field in a predetermined area at said second frequency;

said receiving and transmitting antennas being disposed in coplanar adjacent spaced balanced coupling relationship;

means for energizing said transmitting antenna to alter the resonant properties of said tag circuit at said first frequency in response to a received signal from said receiving antenna, including:

signal transmission means operative to supply said received signal to said energizing means;

transmitting means operative in response to said received signal;

coupling means operative to supply electrical signals from said transmitting means to said transmitting antenna in response to said received signal;

switching means operative in response to said received signal to disconnect said receiving antenna from said energizing means upon energization of said transmitting antenna, thereby to prevent damage to said energizing means during operation of said transmitting antenna.

16. Deactivation antenna apparatus according to claim 15 wherein said coupling means includes:

a first inductive loop on said transmitting antenna; and a second inductive loop on said transmitting signal supply means;

said first and second loops being disposed in a plane perpendicular to the plane of said transmitting and receiving antennas and in adjacent spaced coplanar relationship to each other.

17. Deactivation antenna apparatus according to claim 15 wherein said signal transmission means include a plurality of electrical conductors disposed between and connected to said switching means and extending in a direction perpendicular to the plane of said receiving antenna to a point at which said conductors are surrounded by a metal shield.

18. Deactivation antenna apparatus according to claim 15 wherein said switching means includes means operative in response to said received signal to render said receiving antenna as an open loop upon energization of said transmitting antenna.

19. An antenna system comprising:

a receiving loop antenna operative to provide to utilization means an output indication of the presence of a resonant tag circuit;

a transmitting loop antenna;

said receiving and transmitting antennas being disposed in coplanar adjacent spaced balanced coupling relationship;

means for energizing said transmitting antenna in response to manual actuation, including:

transmitting means operative in response to said manual actuation;

coupling means operative to supply energizing signals from said transmitting means to said transmitting antenna in response to said manual actuation; and switching means operative in response to said manual actuation to isolate said receiving antenna from said utilization means upon energization of said transmitting antenna, thereby to prevent damage to said utilization means during operation of said transmitting antenna.

20. An antenna system according to claim 19 wherein said energizing means further includes means for providing control signals to said switching means, and wherein said signal transmission means is arranged to minimize loading of said transmitting antenna which could affect its resonant frequency.

21. An antenna system according to claim 19 wherein said coupling means includes:

a first inductive loop on said transmitting antenna; and a second inductive loop on said transmitting means;

said first and second loops being disposed in a plane perpendicular to the plane of said transmitting and receiving antennas and in adjacent spaced coplanar relationship to each other.

22. An antenna system according to claim 19 including received signal transmission means coupled to said receiving antenna and comprising a plurality of electrical conductors disposed between and connected to said switching means and extending in a direction perpendicular to the plane of said receiving antenna to a point at which said conductors are surrounded by a metal shield.

23. An antenna system according to claim 22 and including a conductive housing surrounding said antennas and wherein said metal shield includes an elongated conductive enclosure surrounding said conductors and fastened to said antenna housing in a manner to eliminate gaps through which magnetic flux might pass.

24. An antenna system according to claim 19 wherein said switching means includes means operative in response to said manual activation to render said receiving antenna as an open loop upon energization of said transmitting antenna.

25. Deactivation antenna apparatus for an electronic security system comprising:

transmitter means for providing an electromagnetic field in a predetermined area at a first frequency;

a multi-resonant tag circuit having a first resonant frequency at said first frequency and a second resonant frequency;

a receiving antenna operative to provide to utilization means an output indication of the presence of said tag circuit;

a transmitting loop antenna for providing an electromagnetic field in a predetermined area at said second frequency;

said receiving and transmitting antennas being disposed in coplanar adjacent spaced balanced coupling relationship;

means for energizing said transmitting antenna to alter the resonant properties of said tag circuit at said first frequency in response to a manual activation, including:

transmitting means operative in response to said manual activation;

coupling means operative to supply energizing signals from said transmitting means to said transmitting antenna in response to said manual activation;

switching means operative in response to said manual activation to isolate said receiving antenna from said utilization means upon energization of said transmitting antenna, thereby to prevent damage to said utilization means during operation of said transmitting antenna.

26. Deactivation antenna apparatus according to claim 25 wherein said coupling means includes:

a first inductive loop on said transmitting antenna; and a second inductive loop on said transmitting signal supply means;

said first and second loops being disposed in a plane perpendicular to the plane of said transmitting and receiving antennas and in adjacent spaced coplanar relationship to each other.

27. Deactivation antenna apparatus according to claim 25 including received signal transmission means coupled to said receiving antenna and comprising a plurality of electrical conductors disposed between and connected to said switching means and extending in a direction perpendicular to the plane of said receiving antenna to a point at which said conductors are surrounded by a metal shield.

28. Deactivation antenna apparatus according to claim 25 wherein said switching means includes means operative in response to said manual activation to render said receiving antenna as an open loop upon energization of said transmitting antenna.

* * * * *